United States Patent [19]

Nakata et al.

[11] Patent Number: 4,503,312

[45] Date of Patent: Mar. 5, 1985

[54] METHOD AND APPARATUS FOR CONTROLLING RESISTANCE WELDING

[75] Inventors: Shuji Nakata, Toyonaka; Yoshio Kawaguchi; Susumu Aono, both of Yokohama, all of Japan

[73] Assignees: Nissan Motor Company, Limited; Nippon Avionics Co., Ltd., both of Japan

[21] Appl. No.: 466,348

[22] PCT Filed: Jun. 9, 1982

[86] PCT No.: PCT/JP82/00222
§ 371 Date: Feb. 8, 1983
§ 102(e) Date: Feb. 8, 1983

[87] PCT Pub. No.: WO82/04413
PCT Pub. Date: Dec. 23, 1982

[30] Foreign Application Priority Data

Jun. 10, 1981 [JP] Japan .................................. 56-88009

[51] Int. Cl.³ ............................................. B23K 11/24

[52] U.S. Cl. ............................... 219/117.1; 219/86.41; 219/110

[58] Field of Search ..................... 219/117.1, 110, 114, 219/108, 86.41

[56] References Cited

U.S. PATENT DOCUMENTS 4,329,561 5/1982 Schafer et al. ..................... 219/110
4,442,337 4/1984 Nakata et al. ..................... 219/110

Primary Examiner—Clifford C. Shaw
Attorney, Agent, or Firm—Lowe, King, Price & Becker

[57] ABSTRACT

Method of controlling resistance welding to obtain high quality welds in which the pressure between the electrodes (2a, 2b) holding the materials (1a, 1b) to be welded is controlled so that the resistance value between the two electrodes (2a, 2b) is a predetermined value, and the welding current is regulated so that the voltage between the electrodes is a predetermined value, and the time during which the welding current flows is controlled to a fixed period.

8 Claims, 13 Drawing Figures

FIG.11

| No.<br>VOLTAGE DIFFERENCE | 1 | 2 | 3 | | n |
|---|---|---|---|---|---|
| 1 | 0 | 0 | 1 | | 2 |
| 2 | 1 | 1 | 1 | | 4 |
| 3 | 1 | 1 | 2 | | 6 |
| | | | | | |
| m | 15 | 17 | 18 | ------ | 66 |

METHOD AND APPARATUS FOR CONTROLLING RESISTANCE WELDING

FIELD OF THE INVENTION

The present invention relates to a method for controlling resistance welding and an apparatus for controlling the resistance welding according to the method. Particularly, the invention relates to a method and apparatus for controlling resistance welding to make the quality of welding consistent and to improve the quality by adjusting welding conditions such as pressure, welding current, welding time and so forht depending upon the condition of the material to be welded, especially at the welding site.

BACKGROUND OF THE INVENTION

In conventional resistance welding, for example spot welding, generally, the welding strength between the welded members is largely dependent upon the electrode pressure, the size and shape of the electrode tips, the pressure-related wear on the electrodes, and the quality or wear of the welded members. Therefore, it is impossible to obtain consistent welding quality even if the electrode pressure, welding current, and welding time are maintained at constant levels. The term "electrode pressure" used herein refers to the pressure between the electrodes while pinching the welded members.

To cope with this problem, various monitoring systems have previously been devised, such as electrode voltage systems, electrode tip resistance systems, and ultrasonic wave systems. However, since these monitoring systems can only roughly determine the quality of the welded portions after completion of the welding and their respective fields of application differ, they cannot positively ensure the quality of the welded portions. (The term "quality of the weld" refers to the size and penetration rate of the nugget formed at the weld site, the tensile and shearing strengths of the welds thereby provided, and the like.) Accordingly, even when the various prior art resistance welding systems or various monitoring systems are used in combination, there can arise cases in which the quality of weld is poor, making it necessary to repair the weld or discard the product, depending upon the case.

Thus, a controlling system has recently been proposed to overcome this difficulty which automatically ensures the quality of the resistance weld in the process of welding by controlling the electrode pressure or both the electrode pressure and the welding current so that the voltage between the electrodes (including the electrode tips in the case of spot welding) pinching the welded members can be adjusted in accordance with a predetermined reference voltage curve, the instantaneous voltage being chosen to provide a high-quality weld, on the basis that the above voltage has a close relation to the quality of the weld. However, with this system alone, it is impossible to control the size of the nugget of the weld optimally at all times. For instance, in th case where the electrodes are worn by pressure, the diameter of the nugget will become excessively large resulting in an excessively strong weld and greater power consumption than necessary. On the other hand, depending upon the welding conditions, such as the condition of contact surfaces of the welded members, it may happen that, even if the electrode voltage varies in accordance with the reference voltage curve, the required diameter of nugget cannot be obtained due to insufficient current path area.

The present invention is intended to solve the above problem and to automatically ensure the desired quality of the weld without excess and deficiency at all times during the welding process.

SUMMARY OF THE INVENTION

For this purpose, the following fact has been confirmed through experiments and is applied to the controlling of resistance welding: the resistance between the electrodes clamping the welded members while conducting the welding current has a close relationship to the contact surfaces of the welded members, i.e. the current path area, and the current path area of the weld during the welding process can be derived from the resistance between the electrodes. And, it has been confirmed that the voltage across the electrodes has a close relationship with the temperature of and heat generation at the weld site and the voltage curve representing the time variation of the electrode voltage reflects the kinds, shapes and thicknesses of the welded members and thus it is possible to select an optimum voltage curve providing good penetration at the weld site from these factors. Furthermore, it has been already confirmed that the most effective electrode voltage, among these electrode voltage curves for welding is a voltage above a predetermined level, and the integral and time variation of the voltage above the predetermined level controls the quality of the weld.

The present invention is based on the above experimental results. Before application of the welding current to initiate welding, a relatively small current is applied to the electrodes in order to be able to control the welding pressure between the electrodes in such a manner that the resistance between the electrodes pinching the welded members is adjusted to coincide with a predetermined reference resistance. The welding pressure is corrected and controlled during the subsequent application of the welding current during the welding process so that the resistance between the electrodes clamping the welded members will coincide with the instantaneous resistance of a reference resistance curve, and at the same time, the welding current is controlled so that the electrode voltage varies in accordance with a predetermined reference voltage curve, and the welding time is controlled by cutting off the welding current at a time when the integral value of the electrode voltage has reached a predetermined reference integral value. Or alternatively, the welding time can be controlled by cutting off the welding current when the above electrode voltage exceeds a predetermined level voltage and when the integral value of the differential voltage reach a predetermined reference integral value. As a result of this control of the welding pressure between the electrodes and of the welding time, even as the condition of the contact surfaces of the welded member, the pressure-related wear on teh electrode tips and the like change the desired weld quality can also be assured.

BRIEF DESCRIPTION OF THE DRAWINGS

FIG. 11 is a fragmentary diagram of a phase conversion data table stored in the data bank of the phase conversion data outputting circuit of 10.

DESCRIPTION OF THE PREFERRED EMBODIMENT

Now, details of the present invention will be described with reference to the accompanying drawings.

Figure 1:
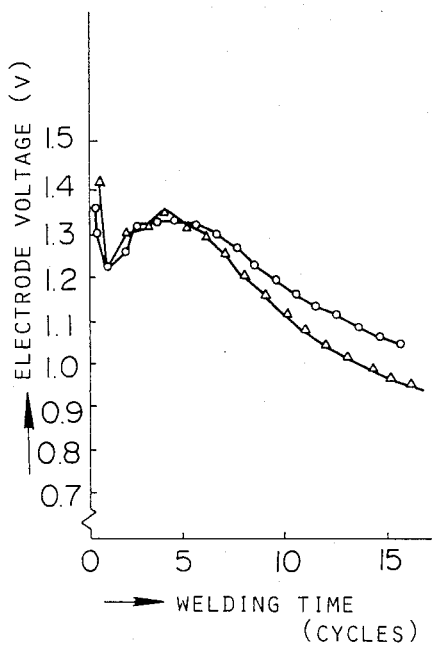
FIG. 1 is a graph of a typical example of the electrode voltage-time curve in the case where a mild steel plate is spot-welded.

FIG. 1 illustrates a typical example of an electrode (tip) voltage-welding time curve (hereinafter referred to simply as "a voltage curve") in the case where a mild steel plate of 0.8 mm thick is spot-welded. And, if the mean diameter of the contact surface between the free end of the electrode tips and the welded members (hereinafter referred to as "electrode tip diameter") is denoted by De, the electrode pressure by P, and the welding current by I, then the curve a shows the voltage curve in the case where De=6.8 mm, P=380 kg, and I=12000 A, while the curve b shows that of the case where De=4.8 mm, P=190 kg, and I=7800 A. The welding time is given interms of the number of cycles of the alternating current employed. As is apparent from the figure, there is not a large difference between the electrode voltages shown in the curves a, b even though the electrode tip diameters are quite different.

Figure 2:
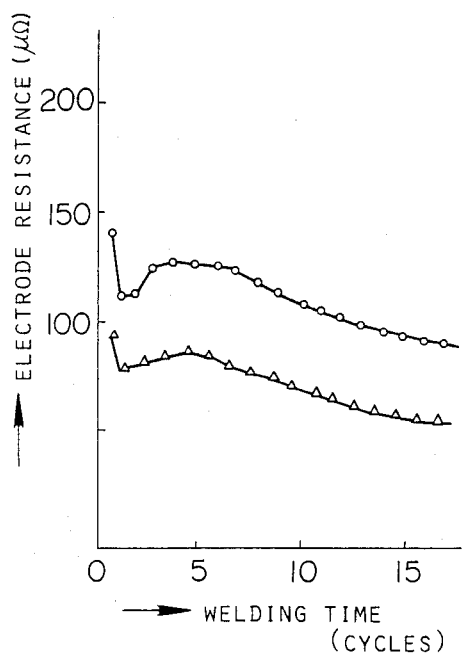
FIG. 2 is a graph of a typical example of the electrode resistance-time curve.

FIG. 2 illustrates a typical example of an electrode resistance-welding time curve (hereinafter simply referred to as "resistance curve" in the case where welding is carried out under the same conditions as in FIG. 1. As is apparent from this figure, the electrode resistance is greatly influenced by the electrode tip diameter, and as shown by the curve a in comparison to the curve b, the electrode resistance tends to decrease as the electrode tip diameter increases.

Figure 3:
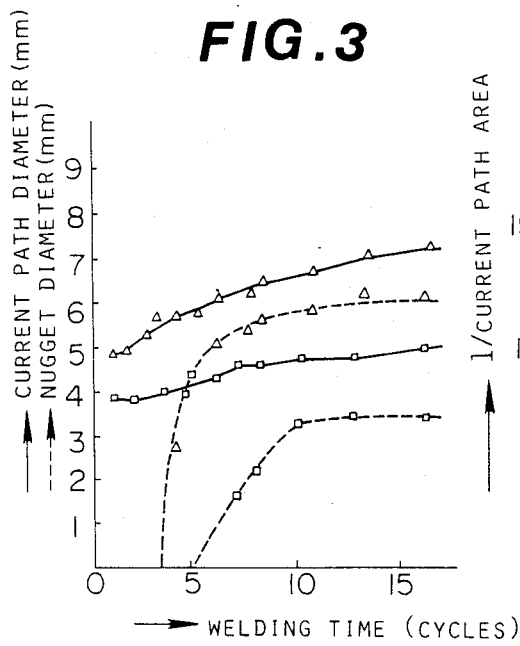
FIG. 3 is a graph of the relationships between the current path diameter and the nugget diameter and welding time.

The curves of FIG. 3 each represent the relation between either the diameter of the current path between the welded members or the diameter of nugget, and the welding time, wherein the curve a-1 shows a current path diameter-welding time curve in the case where De=6.8 mm, P=380 kg and I=12000 A, the curve a-2 shows a nugget diameter-welding time curve under the same conditions, while the curve c-1 shows a current path diameter-welding time curve in the case where De=4.8 mm, P=190 kg and I=6000 A and the curve c-2 shows a nugget diameter-welding time curve under the same conditions. From this figure, it is apparent that in cases in which a nugget is formed, there is a close relationship between the nugget diameter and the current path diameter and the relationship is greatly influenced by the electrode tip diameter.

Figure 4:
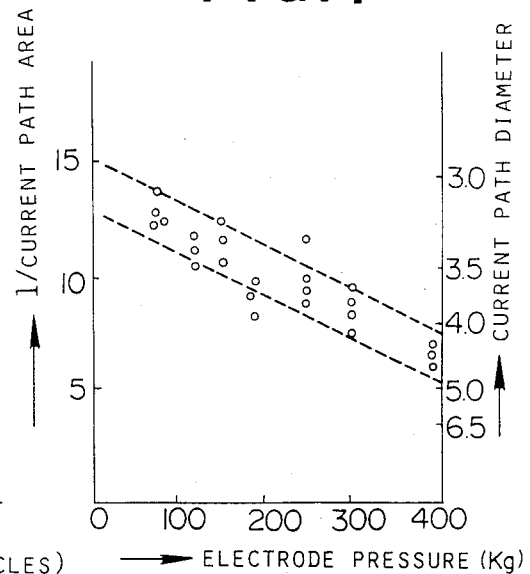
FIG. 4 is a graph of the relationship between the reciprocal of current path area and the current path diameter and electrode clamping force in the initial stage of welding current supply.

FIG. 4 shows the relationships between the reciprocal 1/S of current path area S and between the current path diameter and the electrode pressure at the initial stage of the welding current supply (during the first cycle after the onset of current supply). From this figure, it will be found that there exists a high correlation between the electrode pressure and the current path area or the current path diameter within a dispersion range and the current path area can be controlled by the electrode pressure at the initial current supply stage.

Figure 5:
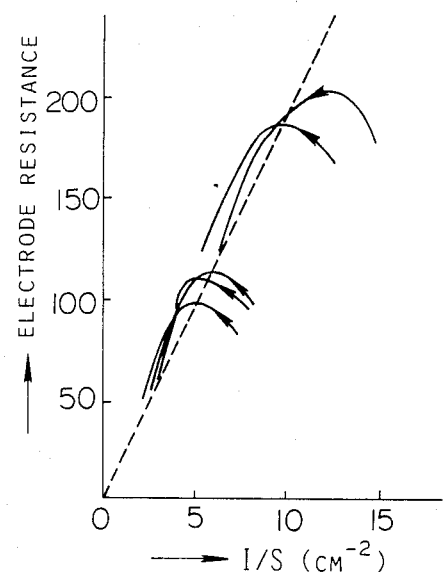
FIG. 5 is a graph illustrating the variation with time of the relationship between the electrode resistance and the reciprocal of the current path area during welding under various welding conditions.

FIG. 5 shows the time variation of the relationship between the electrode resistance and the reciprocal 1/S of the current path area during welding under various welding conditions where the shape and size of electrode tips, electrode pressure, welding current etc. differ. As will be noted from the figure, the electrode resistance varies with time during the welding process. The direction of the arrows in the curves indicates that direction in which time elapses. The electrode resistance and the reciprocal of current path area are substantially proportional to each other after the electrode resistance passes a maximum values and under any conditions the relationship therebetween approaches the same straight proportional line as shown by the dashed line.

Figure 6:
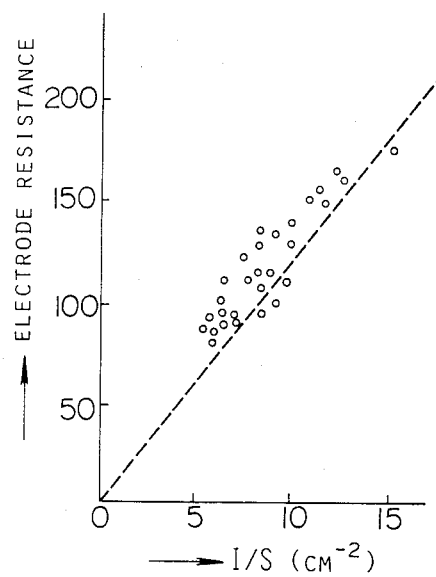
FIG. 6 is a graph illustrating the relationship between the electrode resistance and the reciprocal of the current path area at the initial current supply stage under various welding conditions.

FIG. 6 shows the relationship between the electrode resistance and the reciprocal 1/S of the current path area at the initial current supply stage and under various welding conditions. It will be noted that in this case also there exists a proportional relationship along a substantially straight proportional line shown by the dashed line. From this, it can be easily understood that the electrode resistance R is given by $R = \omega \cdot 1/S$, wherein $\omega$ is the specific resistance of welded members, $1$ is the distance between the electrodes, S is the current path area between the welded members.

The facts indicated by the graphs show that the current path area between the welded members can be easily estimated during the welding process by measuring the electrode resistance. Meanwhile, in this case, even if there is another weld site near the weld in question, it is still possible to estimate the current path area by means of the electrode resistance with almost the same certainty. Furthermore, the electrode voltage and resistance include the voltage and resistance between the electrode tip and the members being welded in addition to those between the members themselves. However, since the former are generally as small as 20–30 percent of the latter and are approximately constant with respect to time, it is possible to regard the electrode voltage and resistance as the values extant between the welded members.

The above facts are always true regardless of the shape and size of the free ends of the electrodes or the kinds of welded members, and there is no fundamental change in this tendency even if the thickness or number of the welded members differs. Accordingly, it is possible to detect the current path area of the welded members during the welding process by detecting the electrode resistance during the welding process. And, since the current path area has a close relationship to the size of the nugget formed, it is possible to obtain a desired weld quality (the desired nugget diameter) by predetermining a reference resistance curve in accordance to which will be formed a current path area which results in the desired nugget diameter and by controlling continuously or at a specified points in time the electrode pressure such that the electrode resistance coincides with the instantaneous resistance value according to the reference resistance curve during the welding process.

Furthermore, since it is already apparent that it is possible to detect the degree of heating between the welded members, i.e., the rate of nugget formation (rate of penetration) depending upon the electrode voltage, it is possible to obtain a more consistent weld quality by controlling the welding current such that the integral value of the electrode voltage follows a voltage curve which corresponds to the appropriate nugget formation rate, in addition to the above control of electrode pressure during the welding process. Control of the welding current supply time can be performed by means for cutting off the welding current after a predetermined proper supply time, i.e. a predetermined number of current cycles; however this can be more reliably controlled if the welding current is cut off when the integral value of the differential voltage, integrated over the time when the electrode voltage exceeds a predetermined reference voltage, reaches a preset desired value.

Now, exemplary embodiments of control system according to the present invention will be described with reference to the accompanying drawings.

Figure 7:
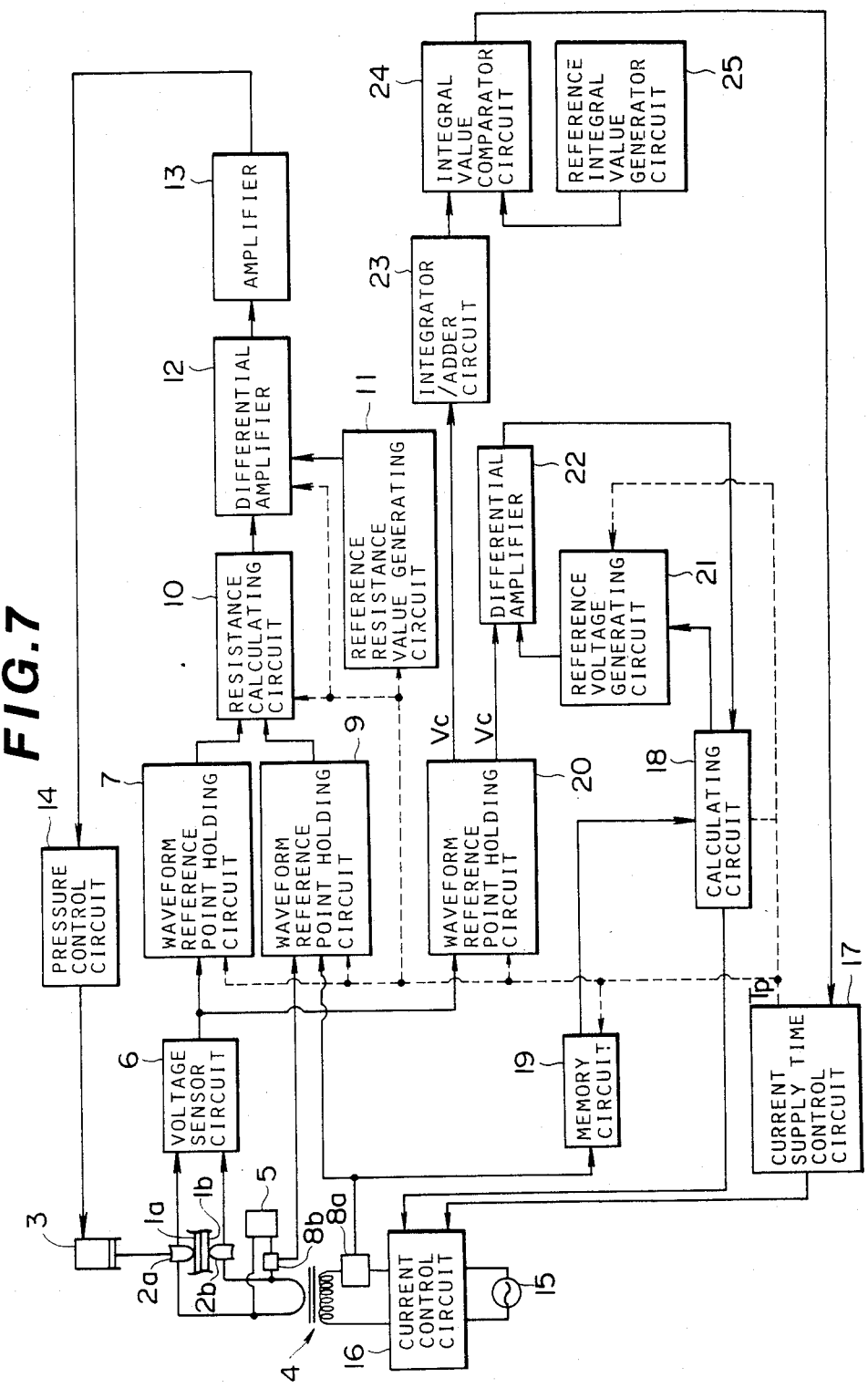
FIG. 7 is a block diagram illustrating the configuration of a first embodiment of the present invention.

FIG. 7 is a block diagram illustrating the configuration of a first embodiment of the present invention. In the figure, the reference numerals 1a, 1b denote welded members such as mild steel plates, the reference numeral 2a a movable electrode connected to a piston 3, and the reference numeral 2b a fixed electrode. During the welding process, the welded members 1a, 1b are clamped and compressed by the electrodes 2a, 2b, and welding current is fed through a transformer 4 from an alternating current source 15 to the welded members. The reference numeral 5 denotes a low-current power source for supply a small current of intensity sufficient to detect the contact resistance between the electrodes 2a, 2b without fusing the welded members 1a, 1b to the electrodes 2a, 2b before the supply of the welding current, and the low-current power source applies a specified small current across the electrodes 2a, 2b before the supply of the welding current from the transformer 4 to the welded members 1a, 1b. Concrete examples of the power source 5 include a small-sized alternating welding power source or a high frequency power source of proper frequency.

The reference numeral 6 denotes a voltage sensor circuit which continuously detects and rectifies the voltage between the electrodes 2a, 2b (hereinafter referred to as "electrode voltage") during supply of the small current or the welding current. The reference numeral 7 denotes a waveform reference point-holding circuit which holds the peak voltage of each half wave of the detected voltage for the period of one-half cycle or for a predetermined period, the reference numeral 8a, a current sensor circuit which continuously detects and rectifies the welding current, the reference numeral 8b, a current sensor which continuously detects and rectifies the small current, and the reference numeral 9, a waveform reference point holding circuit which holds the peak value of each half wave of the detected current of the current sensor circuits 8a, 8b for a period of one-half cycle or for a predetermined period. The reference numeral 10 denotes a resistance calculating circuit which calculates the resistance value across the electrodes 2a, 2b (hereinafter referred to as "electrode resistance") by dividing the voltage value held in the waveform reference point holding circuit 7 by the current value held in the waveform reference point holding circuit 9. The reference numeral 11 denotes a reference resistance value generating circuit, which holds a predetermined reference resistance curve, which reflects the time variation of the electrode resistance in the case where the desired weld quality is achieved, before or during welding current supply and outputs continuously or at predetermined times the instantaneous resistance value indicated by the curve after the onset of welding current supply in synchronism with timing signal Tp from a current supply time control circuit 17 which will be described later. Meanwhile, the term "reference resistance curve" herein used is not necessarily limited to smooth, continuous curves, but may include curves obtained by connecting many resistance values at specific points in time, and the specific points in time may also be a single point, for example, that of the initial stage of the current supply.

The reference numeral 12 denotes a differential amplifier, which compares the voltage corresponding to the electrode resistance derived from the calculation in the resistance value calculating circuit 10 to the voltage corresponding to the instantaneous resistance value from the reference resistance curve from the reference resistance value generating circuit 11 and outputs a signal corresponding to the differential voltage. The reference numeral 13 denotes an amplifier for amplifying the output signal from the differential amplifier 12, the reference numeral 14, a welding pressure control circuit which receives the output signal from the amplifier 13 and controls the piston 3 so as to control the welding pressure between the electrodes 2a, 2b. The reference numeral 16 denotes a current control circuit which is connected to the output side of the alternating current power source 15 and outputs a welding current in accordance with the condition of the weld site. The reference numeral 17 denotes a current supply time control circuit, which functions in cooperation with a welding current supply time automatic control system described later, but may be arranged such that current supply start and stop signals are sent to the current control circuit 16 so as to output the welding current only for a predetermined necessary period of time. Meanwhile, the current supply time control circuit 17 outputs a timing signal Tp for synchronizing the other circuits after the onset of the current supply via leads shown by dashed lines.

According to the above functions, before and during welding current supply, the electrode resistance value and the resistance value derived from the reference resistance curve are compared by the differential amplifier 12 every half-cycle or every predetermined specific time, and the welding pressure control circuit 14 is activated in response to a signal corresponding to the difference to control the welding pressure between the electrodes 2a, 2b by means of the piston 3 so that the difference between the above resistance values will be zero. If the welding pressure increases, then the electrode resistance decreases, while if the welding pressure decreases, then the electrode resistance increases. Therefore, with the electrode resistance controlled during the supply of current so as to conform to the above reference resistance curve within an allowable range or coincide with the resistance value derived from the reference resistance curve within an allowable range at least at predetermined specific points in time, the current path area between the welded members 1a, 1b can be ensured.

Concerning the order of activation, first a small current is supplied by the small current generating power source 5 before the welding current, or before carrying out the actual welding, to detect the contact resistance between the electrode 2a, 2b clamping the welded members 1a, 1b and to correct the welding pressure in advance to a welding pressure adapted to the current contact resistance between the welded members. Thereafter, the welding current is supplied, and by supplied constant welding current to the proper current path area obtained as above for a required period of time, a weld of the desired quality can be obtained. Depending upon the welding conditions, such as the kind of members to be welded, it is also possible to obtain the desired weld quality by effecting the detection of the above electrode resistance and the welding pressure control to ensure the current path area at an initial stage of the welding current supply and then supplying a predetermined constant current for a required period of time. However, in this case, it is possible to prevent the formation of surface flash between the electrodes 2a, 2b and the welded members 1a, 1b or interior flash between the welded members 1a, 1b first by supplying a smaller current than necessary for welding for one or two cycles at the initial stage of welding current supply so as to detect the electrode resistance and to control the welding pressure so that the specified current path area may be ensured during that time, and next by supplying a welding current large enough to effect welding. This also applies to the case where the welding pressure is controlled by detecting the electrode resistance while the welding current is being supplied. In addition, in the case where the electrode resistance is controlled by the welding current, it may sometimes happen that an abnormally high contact resistance at the initial stage causes an erroneous operation of the control system. In such a case, it is preferable to delay the electrode voltage detection via the voltage detection circuit for one or two cycles initially and then to operate the control system.

Next, the control of the electrode voltage defining the welding current will be explained, as will control of the welding pressure between the above electrodes 2a, 2b. Referring to FIG. 7, the current control circuit 16 for the electrode voltage control consists of a thyristor, a triac or other controlling rectifier element. The reference numeral 18 denotes a calculating circuit, which inputs and processes the output signal from an amplifier 22 that will be described later and the output signal from a memory circuit 19, converts the calculated value to a firing phase angle control signal for the current control circuit 16 and outputs it to the current control circuit 16. The memory circuit 19 stores the preceding firing phase angle for one or two cycles of the initial current supply stage to start the current supply and after one or two cycles at the onset of current supply actuates the waveform reference point holding circuit 20 to start the control after one or two cycles of current supply. The actual current flow is detected by the current sensing circuit 8a, and the firing phase angle of the preceeding half-cycle is stored at respective points in time. The reference numeral 20 denotes a waveform reference point holding circuit similar to the waveform reference point holding circuit 7, which holds for a half-cycle or a predetermined period the peak value of each half-wave electrode voltage detected by the voltage detecting circuit 6. The reference numeral 21 denotes a reference voltage generating circuit, in which is previously set and stored a reference voltage curve corresponding to the time variation of the electrode voltage which results in a high-quality weld, thereby outputting continuously a reference voltage based thereon in synchronism with the timing signal Tp from the current supply time control circuit 17 after the onset of current supply. A differential amplifier 22 inputs and compares the output voltages of the waveform reference point holding circuit 20 and the reference voltage generating circuit 21 and outputs a signal corresponding to the differential voltage.

According to the above function, for the initial stage of welding current supply, irrespective of the value of the output signal from the differential amplifier 22, the calculating circuit 18 outputs a firing phase angle control signal based on an initial stage current firing phase angle to control the current control circuit 16 which then outputs a specified current. Accordingly, possible erroneous operation of the control system due to variation of initial stage contact resistance and initial flash can be prevented. Thereafter, both the output signal from the differential amplifier 22 and the firing phase angle data from the preceeding half-cycle stored in the memory circuit 19 are inputted to the calculating circuit 18 and the firing phase angle signal is changed so that the welding current may be controlled in the direction in which the output voltage of the differential amplifier 22 approaches zero. Thus, the current control circuit 16 controls the welding current, and the electrode voltage increases when the welding current increases, and decreases when the welding current decreases. Even if the temperature distribution of the two welded members is the same, the electrode voltage changes when the firing phase of the welding current changes. Therefore, it is necessary to correct the reference voltage curve stored in the reference voltage generating circuit 21 according to the magnitude of firing phase angle. For this reason, the firing phase angle of the actual welding current stored in the memory circuit 19 is transferred to the reference voltage generating circuit 21 through the calculating circuit 18 to correct the reference voltage curve based on the phase angle. Keeping pace with the control of electrode voltage based on the control of welding current, the above electrode resistance is detected and thereby the welding pressure between the electrodes is controlled. As described above, since the welding current and the electrode pressure are controlled during the welding current supply so that the electrode voltage varies in accordance with the reference voltage curve and the electrode resistance varies in accordance with the reference resistance curve, desired weld quality of the weld can be achieved.

According to this configuration, it is possible to widen the controllable range of conditions and to exercise adequate control at all times in accordance with the condition of the welded members, in cases where the conditions of resistance welding, especially the contact conditions among the electrodes 2a, 2b and the welded members 1a, 1b are liable to change, for instance in the case where the welding is applied to pressed parts or high-tension steel plates. Furthermore, in the case where the free ends the of electrodes tips are heavily pressure-worn, it is possible to prevent excessively large nuggets from being formed and excessive energy (electric power) from being consumed, since the current path area between the electrodes and the welded members and between the welded members can automatically regulated. Although it has been stated hereinabove that the electrode resistance is detected continuously and compared continuously with the reference resistance curve and the electrode pressure is controlled in accordance with the difference between the resistance values, it is also possible to control the electrode pressure in accordance with the differences of the measured electrode resistance from the reference resistance by detecting the electrode resistances at the initial stage alone or at specific points in time, for instance at the start, the middle and the end of the current supply. In general, when a hydraulic servo system is used for the control of electrode pressure, a response of about 50 Hz can be easily obtained; however, when the electrode pressure is controlled at specific points in time, for instance at the start, at the middle, and at the final stage of the current supply, a penumatic electrode pressure system which is slower in response can be used.

Next, the process whereby the welding current supply time is automatically and optimally controlled will be explained. For this purpose, an integrator/adder circuit 23, an integral value comparator circuit 24 and a reference integral value generator circuit 25 are provided. The integrator/adder circuit 23 integrates and adds maximum values Vc of the electrode voltage at every half-wave outputted from the waveform reference point holding circuit 20. The integral value comparator circuit 24 compares the integral value outputted by the integrator/adder circuit 23, i.e., the integral value of the electrode voltage Vc, with the integral value outputted by the reference integral value generator circuit 25 previously set such that the desired weld quality will thereby be achieved, and, when they agree, sends a signal that cuts off the welding current to the current supply time control circuit 17 so as to cut off the welding current. By this arrangement, the welding current supply time can be automatically controlled always to the optimum time, and thus a more appropriate weld quality can be achieved.

Figure 8:
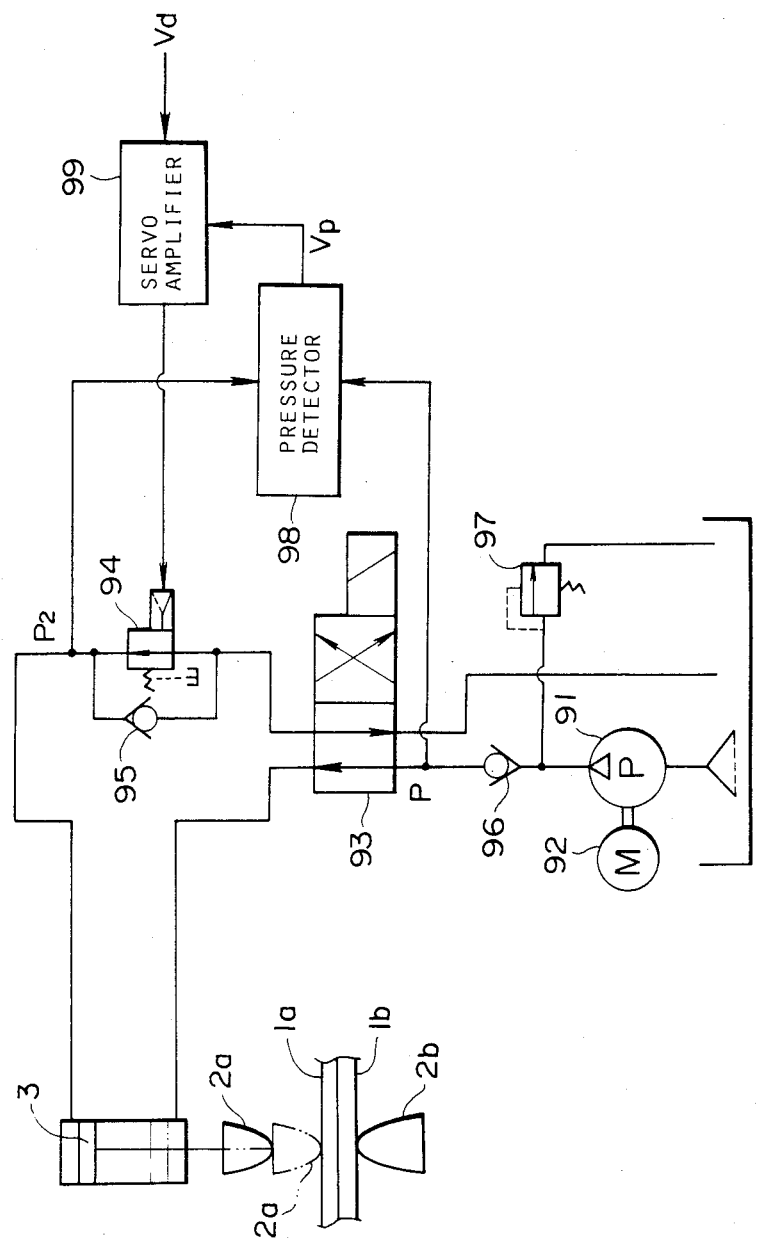
FIG. 8 is a block diagram illustrating a concrete example of the welding pressure control circuit 14 of FIG. 7.

FIG. 8 illustrates a concrete embodiment of the welding pressure control circuit 14. In this figure, the reference numeral 91 denotes a hydraulic pump which is driven by a motor 92, the reference numeral 93, a two-way valve, the reference numeral 94, a proportional pressure reduction valve for adjusting the welding pressure, the reference numerals 95,96, check valves, and the reference numeral 97, a relief valve. A hydraulic circuit is formed by connecting these members to the upper and lower ends of the cylinder chamber of the piston 3 via tubing. The reference numeral 98 denotes a pressure detector which detects the pressure applied to the piston 3 on the basis of a differential pressure between the pressure gate ports $P_1$ and $P_2$, and the reference numeral 99, a servo amplifier which receives the signal Vd from the above amplifier 12 and outputs a signal which controls the proportional pressure reduction valve 94, using a signal Vp representative of the pressure detected by the pressure detector 98 as a feedback signal. When the two-way valve 93 is as illustrated in the figure, the hydraulic pressure is supplied to the lower end of the cylinder chamber of the piston 3 so as to elevate the electrode 2a, while, when the two-way valve 93 is switched to the reverse direction in the Fig. by a signal from a control panel (not shown), the hydraulic pressure supplied by the hydraulic pump 91 is supplied through the proportional pressure reduction valve 94 to the upper end of the cylinder room of the piston 3 to push the electrode 2a down as shown by phantom lines, so that the electrode 2a presses the welded members 1a, 1b in cooperation with the electrode 2b. The welding pressure is continuously increased and decreased depending upon the signal Vd, with the proportional pressure reduction valve 94 controlled by the servo amplifier 99 in response to the signal Vd.

When the current path area between the electrodes and the welded members and between the welded members excessively increases due to pressure-wear on the electrode tips, the welding current required to match the electrode voltage to the reference voltage value increases, but the welder cannot supply current beyond the current capacity thereof. Therefore, it is preferable to detect the difference between the maximum current suppliable by the welder and the required welding current and to output a signal when the difference becomes zero, in order to stop the control function and to display or warn of it. In spot welding, the shape of the free end of the electrode tips affects the relation between the welding pressure and the current path area, especially the proportionality constant thereof, and, although tips of any shape may be used, in general it is preferable to use round or dome-shaped tips from the view point of controlling the current path area by way of the welding pressure. In this controlling system, in the case where the voltage between the electrode tips deviates from the reference voltage, the differential voltage is detected and the welding current is changed so that the differential voltage is eliminated, and this change of the welding current is usually effected by changing the firing angle of the thyristor within the welding current control unit. The relationship between the differential voltage and the amount of change of firing angle of the thyristor is previously set separately in consideration of the response of the control system, and in general when the power source voltage is kept constant, it is unnecessary to change this relationship. However, in cases where the power source voltage varies widely with time, for instance when the system is used at massproduction rate, at the times when the power source voltage widely varies it is sometimes difficult to provide such a sufficient change of the welding current as to eliminate the differential voltage if the firing angle of the thyristor for changing the welding current so as to eliminate the differential voltage is set at the same level as before the change. Therefore, when the power source voltage changes, it is possible to ensure good welding quality effectively with the present control system by changing the relationship between the differential voltage and the thyristor firing angle according to the amount of change of power source voltage, even if the power source voltage changes widely. Meanwhile, the detection of welding current is carried out in every case at the primary side of the welding transformer; however, it can be also carried out at the secondary side. And, it is preferable to detect the welding current on the secondary side in case of multispot welding, serial spot welding or the like.

Figure 9:
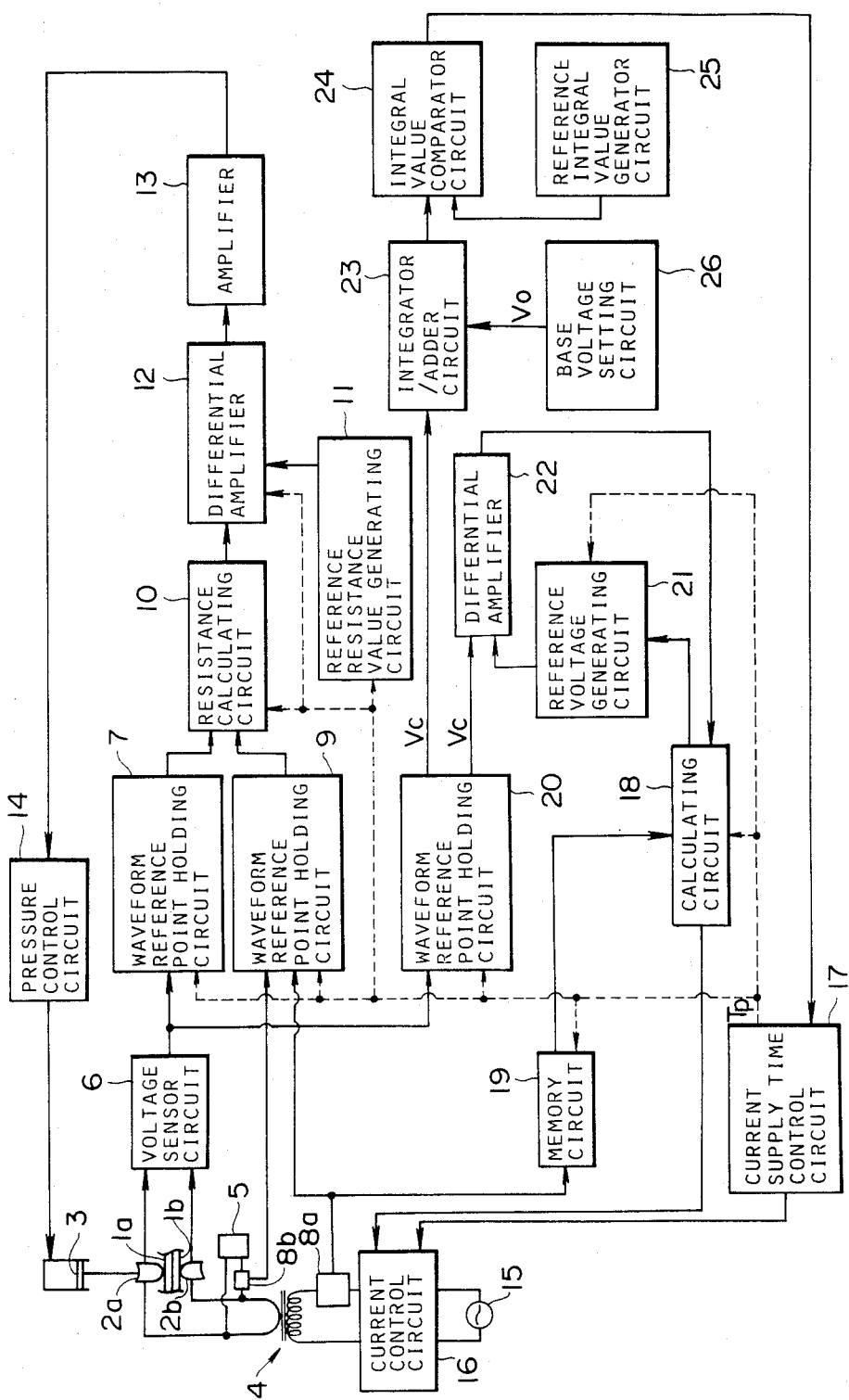
FIG. 9 is a block diagram illustrating the configuration of a second embodiment of the present invention.

FIG. 9 is a block diagram illustrating the configuration of a second embodiment of the present invention. This embodiment is capable of further improving the accuracy of control of the welding current supply time by utilizing the differential voltage integral value integrated over the time when the above described electrode voltage Vc exceeds a predetermined base voltage Vo. In this figure, the same functions as those in FIG. 7 are shown by the same reference numerals, and thus the description of these portions will be omitted. Meanwhile, the departures from the embodiment of FIG. 7 are that a base voltage setting circuit 26 is provided in the integrator/adder circuit 23 and that the reference integral value generator circuit 25 holds a previously determined reference voltage integral curve, which represents a high-quality weld, and outputs an instantaneous reference voltage (integral value).

In this second embodiment, the integrator/adder circuit 23 integrates and adds the differential voltage (Vc-Vo) only when the peak value Vc of each halfwave of the electrode voltage outputted by the waveform reference point holding circuit 20 exceeds the base voltage Vo which is preset by the base voltage setting circuit 26. The integral value comparator circuit 24 compares the integral value outputted by the integrator/adder circuit 23, or the integral value from the differential voltage (Vc-Vo) when the electrode voltage Vc exceeds the base voltage Vo, with an integral value outputted by the reference integral value generating circuit 25 and when the values coincide outputs a signal to the current feeding time control circuit 17 which cuts off the welding current. Thereby, the welding current supply time can be automatically controlled to the optimum time under all conditions and thus a more appropriate weld quality can be achieved.

Figure 10:
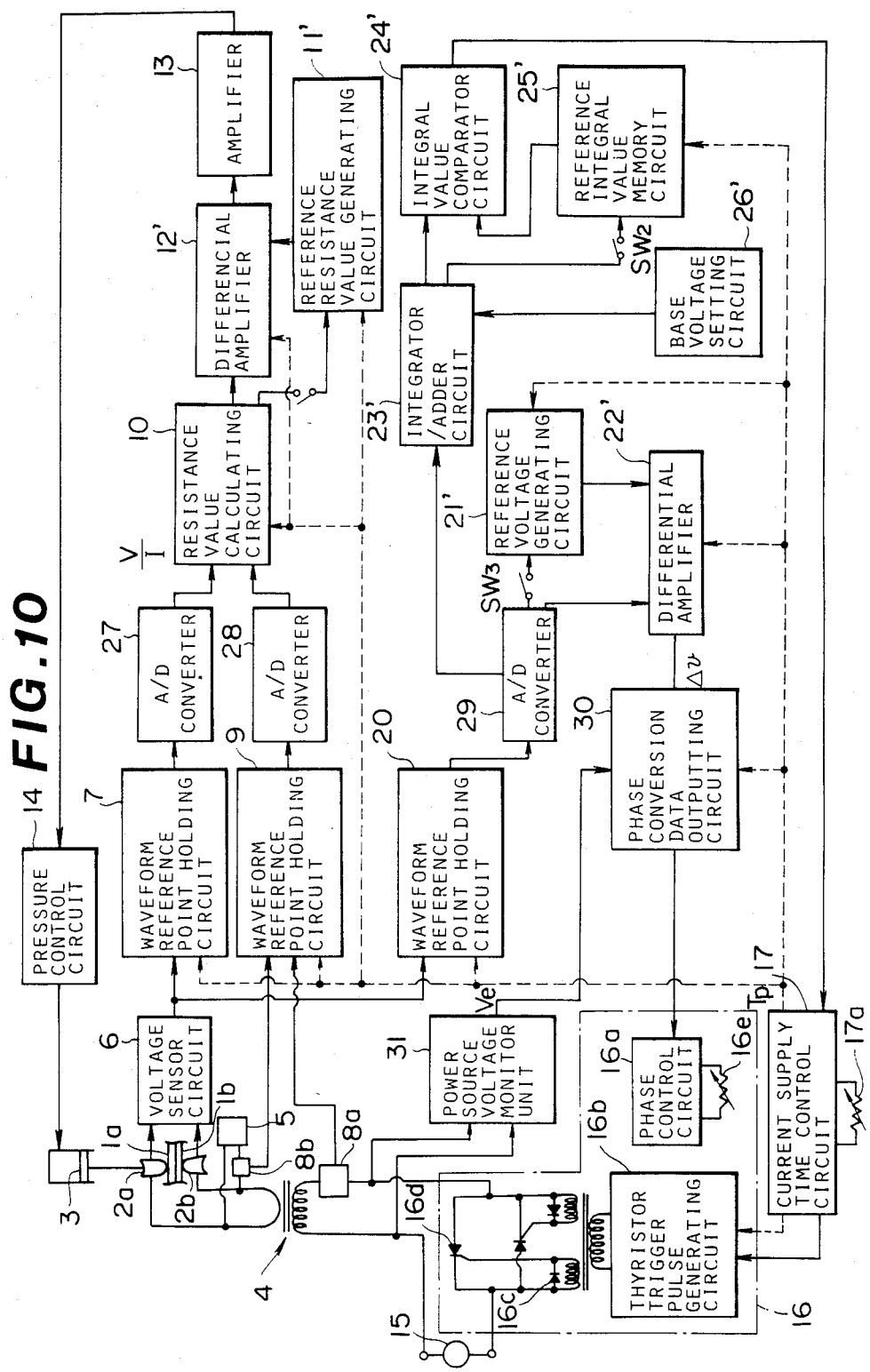
FIG. 10 is a block diagram illustrating the configuration of a third embodiment of the present invention.

FIG. 10 is a block diagram illustrating the configuration of a third embodiment of the present invention. In accordance with this embodiment, as in the previous first and second embodiments, not only is control of the welding pressure, welding current and current supply time effected using the differential electrical properties obtained by comparing, at each sampling interval of one-half cycle, the electrical properties, namely the electrode voltage, electrode resistance and current values during welding under preset optimum welding conditions with the quantity of electricity detected during subsequent welding, but also effected a wide range of arithmetic operations as described above concerning the individual welder itself, welding conditions or variation thereof can be effected during each half cycle. Accordingly, it is possible to let the electrical property in question promptly and surely conform to the reference electrical property during welding.

Referring to FIG. 10, the outputs of the waveform reference point holding circuit 7, 9 and 20 are respectively converted from analog to digital (hereinafter referred to as "A/D") by analog-to-digital converters 27, 28 and 29. The output voltage value of the A/D converter 27 and the output current value of the A/D converter 28 are inputted to a resistance value calculating circuit 10' in which electrode resistance is derived by dividing the voltage value by the current value. The derived electrode resistance is stored via a switch $SW_1$ in a reference resistance value memory circuit 11'. With respect to the output electrode voltage of the A/D converter 29 on the other hand, only when it exceeds the base voltage Vo preset by the base voltage setting circuit 26', the differential voltage (Vc-Vo) is integrated by the integrator/adder circuit 23' and stored via a switch $SW_2$ in the integral voltage value memory circuit 25'. In addition, the output of the A/D converter 29 is received via a switch $SW_3$ by the reference voltage memory circuit 21' to store the electrode voltage. These memory circuits 11', 21' and 25' respectively store the corresponding electrical property values for the case of welding under optimum welding conditions, and may consist of, for example, a magnetic memory or a RAM (Random Access Memory) composed of a semiconductor. In addition, the memory circuit 21' may be connected to a display unit (not shown) for example, an ordinary pin-type oscilloscope or an electromagnetic oscilloscope so that digital values continuously stored may be displayed and observed in the form of voltage waveforms.

In the resistance value comparator circuit 12', a digitalized resistance value stored in the reference resistance value memory circuit 11' and the digital value of the resistance newly detected in the on-going welding process are compared at each half-cycle and the difference between the two resistances is outputted to the amplifier 13. In the integral voltage value comparator circuit 24', a digitalized reference integral voltage value stored in the reference integral voltage value memory circuit 25' and a integral voltage value newly obtained in the on-going welding process are compared at each half-cycle and the difference between the two integral voltage values is outputted to the current supply time control circuit 17. In addition, in the voltage comparator circuit 22', too, a digitalized reference voltage waveform stored in the reference voltage memory circuit 21' and the digital value of the electrode voltage newly detected in the on-going welding process are compared at each half-cycle, and the difference between the two voltages is outputted to a phase conversion data outputting circuit 30. The phase conversion data outputting circuit 30 contains a data bank of phase conversion values previously chosen so that the digital values of the differential voltage and the phase conversion quantity of the current control circuit 16, which controls the welding current, correspond, and when the digital value of the differential voltage is outputted by the comparator circuit 22', the data bank detects the phase conversion quantity corresponding to the differential voltage and inputs it to the current control circuit 16. The phase conversion data outputting circuit 30 also receives voltage data from the power source 15 through a power source voltage monitor unit 31, which will be described later.

The phase conversion data bank of the phase conversion data outputting circuit 30 may consist of, for example, a magnetic memory or a ROM (Read Only Memory) composed of a semiconductor. In the ROM is stored a phase conversion data table as schematically shown in FIG. 11. In this figure, the lefthand numerals 1, 2, ..., m are arranged in terms of the absolute value of the differential voltage Dv between the reference electrical property, for example the electrode voltage Vs obtaining when the welded members 1a, 1b are welded previously under optimum welding conditions, and the electrode voltage Vc detected during the current welding. These numerals are determined by first estimating the maximum value of variation (range) of the differential voltage Dv by experiment, and then limiting the storage capacity of the phase conversion data table on the basis thereof, and dividing same into m equal parts. The numerals 1, 2, ... n along the top row (referred to as "table numbers or index addresses") are determined empirically by finding a value with an adequate range with regard to the welding machine, welding materials and welding condition anticipated to be used and with respect to control recovery rate (loop gain), and then dividing the value into n parts. Auuming that the welding current to be used in conjunction with differential voltage Dv is Di, the relation between the two can be expressed as follows:

$$Di_p = kDv(p-1)$$

Here, the symbol k denotes the control recovery rate, and p is the number of repetitions of half-cycle periods. That is, the data table contains coded values of the firing angle of a silicon control rectifier within the current control circuit 16 corresponding to the values of the respective loop gains in the above formula on the basis of the differential voltage Dv between the reference electrode voltage Vc and the electrode voltage detected during subsequent welding. The value is retrieved from the phase conversion data output circuit 30 and outputted to the current control circuit 16.

The current control circuit 16 is composed of a phase control circuit 16a, a thyristor trigger pulse generating circuit 16b, a switching element 16c and a silicon control rectifier (SCR) 16d. The output of the phase control circuit 16b, the details of which will be described later, is sent to the thyristor trigger pulse generating circuit 16b. The thyristor trigger pulse generating circuit 16b generates trigger pulses during the operation of the current supply time control circuit 17. The output of the thristor trigger pulse generating circuit 16b is applied via the switching element 16c to the SCR 16d. The supplied voltage from the ac power source 15 is regulated by the SCR 16d and supplied via the transformer 4 to the welding electrodes 2a, 2b.

If, by way of example, the absolute value of the output differential voltage Dv of the comparator circuit 22' corresponds to "3" in the column of differential voltage indices of the phase conversion data table, and the separately selected table number (to be described later) is "2", then the firing angle of the SCR 16d would be corrected by an amount corresponding to the value "1" found in the phase conversion data table at the intersection defined by the two former values. Since the differential voltage Dv shown in the phase conversion data table is the absolute value thereof, when Dv>0, the output value is positive, when Dv<0, the output value is negative and when Dv=0, the output value is 0.

Figure 12:
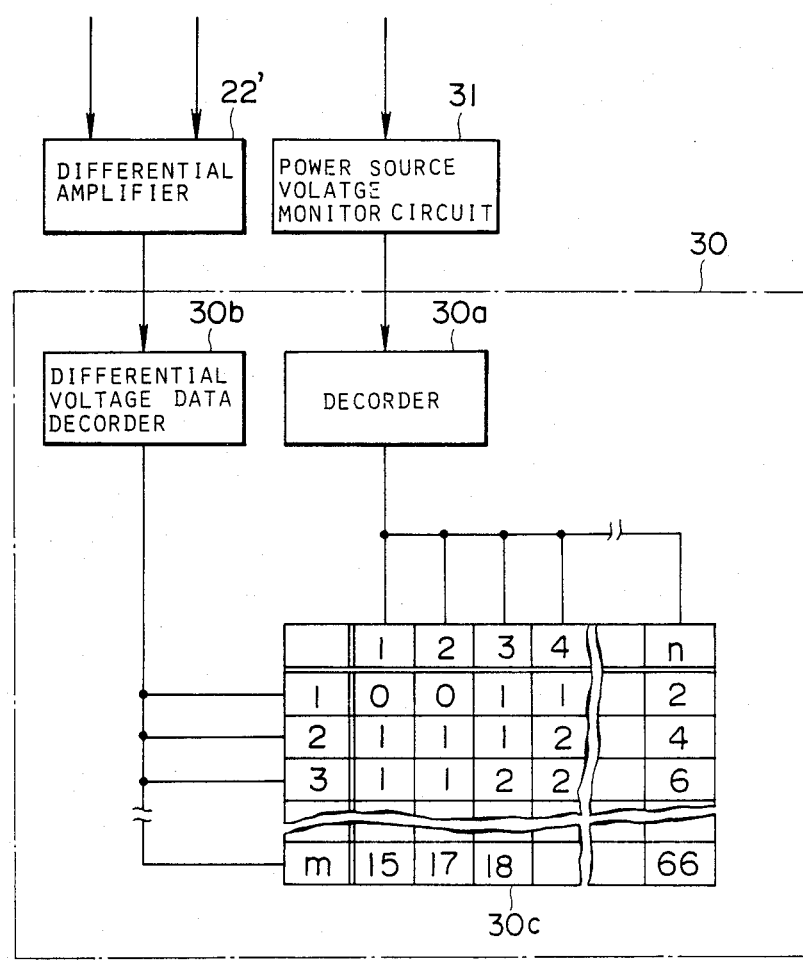
FIG. 12 is a block diagram illustrating the selection of the table values of the phase conversion data table in FIG. 11 for the purpose of further explanation thereof.

Selection of the table numbers 1, 2, ..., n is made in order to compensate the quantity of correction of the firing angle of the above SCR 16d in cases where the power source voltage varies or the above value of differential voltage Dv deviates beyond a previously supposed allowable range. Considering here cases other than that in which the value of the differential voltage Dv deviates beyond the allowable range, the compensation for the variation of the power source voltage Vc is firstly effected by selecting the table number before the start of individual welding processes, and then selecting the compensation based on the quantity of differential voltage Dv during the welding processes. These controls will be described in detail with reference to FIG. 12.

In the figure, the power source voltage monitor unit 31 constantly monitors the voltage Vc of the power source 15, and may consist of, for example, a known digital volt member or the like. The voltage data digitalized by the power source voltage monitor 31 is supplied to a power source voltage decoder 30a of the phase conversion data output circuit 30. The decoder 30a outputs the magnitude of deviation of the input voltage with respect to the reference voltage value in the form of classified plural-level signals. For instance, when the reference voltage, corresponding to welding under optimum welding conditions, is set at 100 V and the condition required for a shift from a firstly specified table number to another is a 5% change in the value of the power source voltage, the decoder 30a outputs a selection signal that shifts the table number up by one rank when the power source voltage is in the range of 105-109 V, outputs a selection signal that shifts up by two ranks when in the range of 110-114 V, and outputs a selection signal that shifts up by three ranks when in the range of 115-119 V. Similarly, when the power source voltage is lower than the reference voltage and is in the range of 95-91 V, it outputs a selection signal that shifts the table number down by one rank, outputs a selection signal that shifts down by two and three ranks when in the range of 90-86 V and when in the range of 85-81 V, respectively. In this manner, the selection signal obtained from the decoder 30a is inputted to a data bank 30c and the table number is selected (specified) in accordance with the shifting due to the selection signals. Assuming that the table number "2" is selected at the start of the welding in consideration of the deviation at that time and the power source voltage is then boosted by 5%, the table number 3, shifted one rank up, is selected while, when the power source voltage is lowered by 5%, when the table number 1 is selected.

In the case where welding is being adequately effected with the table number thus selected, the selection of the differential voltage number during subsequent selding is effected (by the differential voltage data coder 30b) and if the value of the differential voltage Dv between the reference electrode voltage Vs and the electrode voltage Vc detected during subsequent welding deviates widely beyond the preset allowable range due to some variations of conditions, then the table number of the phase conversion data bank 30c which has been already selected on the basis of the power source voltage is further corrected in accordance with the differential voltage Dv. In order to cope with this case, a differential voltage decoder 30d (not shown in the figure) is provided in the phase conversion data outputting circuit 30 which is separately activated by a threshold value, and it is so arranged that, upon receipt of the output of the comparator circuit 22, the table number of the phase conversion data bank 30c may be shifted by the decoder output obtained. For example, when the differential voltage Dv exceeds 0.3 V, the table number of the phase conversion data bank 30c is automatically shifted by one rank by the differential voltage decoder 30d as in the case where the power source voltage varies. The data table thus devised is capable of optimally adjusting the firing angle of the SCR 16d.

The phase control circuit 16a within the current control circuit 16 is provided with a welding current setting circuit, which is set at the initial stage of the welding by controlling the thyristor trigger pulse generating circuit 16b via a welding current setting knob 16e. Meanwhile, the data output received by the phase control circuit 16a and retrieved from the phase conversion data output circuit 30 is sent to the thyristor trigger pulse generating circuit 16b directly through the phase control circuit 16a unchanged, since it has previously been converted to a phase conversion quantity. The trigger pulse of the thyristor trigger pulse generating circuit 16b to which the data output is sent is digitally shifted by an amount corresponding to the phase conversion quantity, and the firing angle of the SCR 16d is controlled so as to conform to the standard electrode voltage waveform.

With respect to operational steps of the control function which are effected by the phase conversion data output circuit 30 constructed as above, explanations will be made hereinbelow. Firstly, in advance of an actual welding operation, welded members are experimentally welded so as to determine the most appropriate welding conditions (welding current, current supply time and welding pressure) for welding the welded members, and the welding current and current supply time of the welding conditions are set by the welding current setting knob 16e of the phase control circuit 16a and the welding time (current supply time) setting knob 17a of the current supply time control circuit 17. Thereafter, with the welded members 1a, 1b clamped and compressed by the upper and lower electrodes 2a, 2b which are mounted on the head of the welding machine (not shown), a microswitch provided in the welding machine reacts to a preset welding pressure to send an instruction for starting the current supply to the current supply time control circuit 17. In the control circuit 17, the welding current is supplied to the welded members 1a, 1b starting from the instruction of the microswitch for a period of time preset by the welding time setting knob 16e via the SCR 16d which is controlled by the thyristor trigger pulse generating circuit 16b. The voltage waveform which is generated between the welding electrodes 2a, 2b at this initial welding stage is a voltage waveform that serves as the standard for the subsequent welding operations, and is held via the voltage detecting circuit 6 by the waveform reference point holding circuit 20. The output of the waveform reference point holding circuit 20 is A/D converted at the A/D converter 29 and stored via the switch SW₃ in the memory circuit 21'. The waveform which is stored in the memory circuit 21' after going through this process is referred to as a standard voltage waveform. When the standard voltage wave form optimized for the welded members has been stored by way of the previously-described operations in the memory circuit 21', the actual welding operations are carried out with the switch SW₃ opened.

The electrode voltage picked up during the same kind of welding subsequently carried out and processed by the waveform reference point holding circuit 20 and the A/D converter 29 is received by the comparator circuit 22' and compared with the standard voltage waveform from the memory circuit 21'. This comparison is performed at specified sampling intervals (half cycle) and the differential value (differential voltage) between the two voltage wave forms is derived and sent to the phase conversion data output circuit 30. In the phase conversion data output circuit 30, the preset table number of the phase conversion data table is first corrected just before welding in accordance with the magnitude of deviation of the power source voltage from the power source voltage monitor 31 and then the phase conversion data (quantity of the phase conversion) of the SCR 16d within the table cell corresponding to the above differential voltage and to the number thus compensated is retrieved. The retrieved data is inputted to the latter stage phase control circuit 16a to successively regulate the firing angle of the SCR 16d via the thyristor trigger pulse generating circuit 16b and the switching element 16c, and thus the value of the welding current is increased/decreased each cycle. As a result thereof, the voltage waveform of the welding electrodes follows the standard voltage waveform and thus the welding quality is always maintained constant.

According to this embodiment, not only can the standard voltage waveform be traced promptly and surely, even if deviations occur, such as divided flow due to the proximity of the weld site to a previous weld site, the surface condition at the weld site or the welding conditions (welding current, current feeding time and welding pressure), the standard voltage waveform can still be traced.

Figure 13:
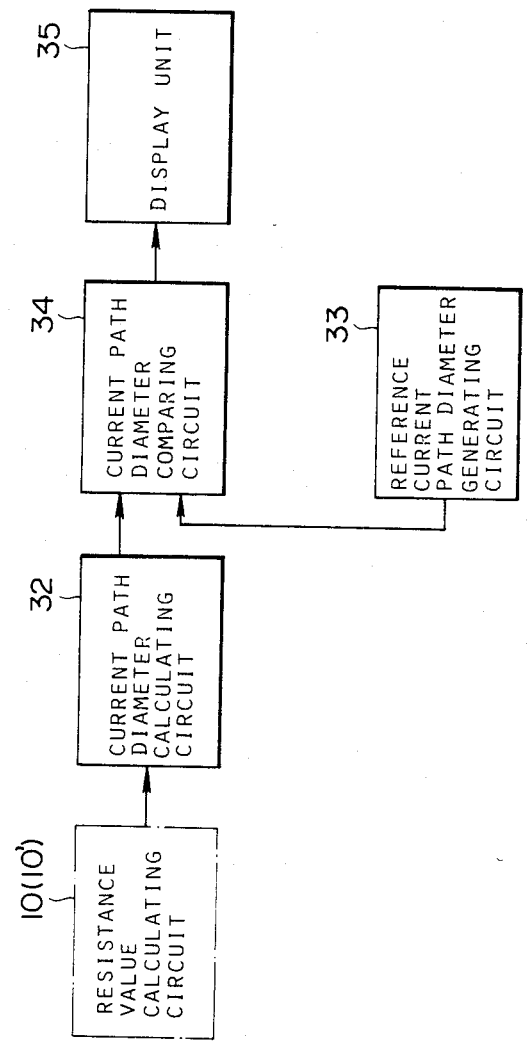
FIG. 13 is a block diagram illustrating the configuration of an embodiment of the electrode exchange-time display system according to the present invention.

FIG. 13 is a block diagram illustrating the configuration of an embodiment of an electrode exchange time display system of the present invention. This display system is to detect and display the electrode tip diameter by detecting the electrode resistance R, on the basis of the fact that the electrode resistance R and the reciprocal 1/S of the current path diameter (area) are proportional as described above and that the current path diameter is substantially the same as the electrode tip diameter. In the figure, the reference numeral 32 denotes a current path diameter calculating circuit, which is connected to the resistance value calculating circuit 10 or 10' of the embodiments shown in FIGS. 7, 9 and 10. And, on the basis of the electrode resistance value outputted from the calculating circuit 10 or 10', the current path diameter is derived by the current path diameter calculating circuit 32. The reference numeral 33 denotes a reference current path diameter generating circuit, which outputs a signal at a specified point in time, for example, at one point in time of the initial stage of current supply, corresponding to a previously defined electrode tip diameter representing pressure-worn electrode tips 2a, 2b which have reached the time of exchange. The outputs of the current path diameter calculating circuit 32 and the reference current path diameter generating circuit 33 are compared by the current path diameter comparator circuit 34. When the current path diameter exceeds the value of the reference current path diameter, that fact is sent to be displayed on a display unit 35, such as a lamp, buzzer and the like. Accordingly, the arrival of exchange time for the electrodes can be indicated to the operator or the like.

Although the above respective embodiments have been described with regard to the case in which the welding is carried out using alternating current, and, according, the sampling value control, which controls the waveform, is carried out by taking the peak value of each half-wave as the reference point thereof it is also possible to execute repetitive control in the case that the welding is performing by means of direct current. Furthermore, though the descriptions have all referred to cases where the present invention is applied to the spot welding, the present invention can be also applied to other resistance weldings, namely, to projection welding, seam welding, flash welding, upset welding and other types of welding. Furthermore, in the case of multispot welding, serial spot welding and the like in which plural electrodes are employed in a single welding machine, it is possible to independently and easily control the quality of each weld as required by individually detecting and controlling the electrode pressure at each weld site.

As will be apparent from the above explanations, in accordance with the control system of the present invention, since the welding pressure between the electrodes clamping the welded members or the welding pressure and the welding current are controlled by detecting the resistance between the electrodes or both the resistance and the voltage during the welding process to that the desired quality of the resistance weld is assured subsequent processing of substandard welds and complete loss of finished products can be nearly eliminated, and thus the reject rate of the products can be greatly reduced and the operating efficiency can be improved. In addition, the control of welding pressure between the electrodes is particularly effective for preventing flashes, which improves safety and prevents degradation of appearance and quality.

Furthermore, in the case where the power source voltage greatly varies or in the case where the difference between the reference voltage waveform and electrode voltage detected during subsequent welding is large, the standard voltage waveform can be also traced, and thus very good welding quality can be ensured.

Moreover, since the electrical properties corresponding to welding under optimum welding conditions are measured and automatically stored, only very simple preparation is required before starting the actual welding even in low-quantity manufacture of different kinds of products, and, the electrical properties are controlled at every half-cycle during current supply, the welding quality can be assured not only in the case of resistance welding of the members requiring a relatively long current supply time, but also in the case of electronic parts and the like requiring a very short current supply time.

We claim:

1. A method for controlling resistance welding comprising the steps of:
   holding the portion of a material to be welded between a pair of electrodes under a pressure;
   applying an initial current having a magnitude less than that of a welding current for said electrodes in advance of performing welding;
   detecting the resistance between said electrodes in the presence of said initial current;
   controlling the pressure on said electrodes on the basis of the detected resistance so as to adjust the resistance between said electrodes to a predetermined resistance;
   applying a welding current between said electrodes to perform resistance welding;
   detecting the voltage between said electrodes while the welding current is applied thereto;
   controlling the welding current flowing between said electrodes to adjust the voltage detected between said electrodes to a predetermined voltage; and
   measuring the period during which said welding current is applied and interrupting said welding current when said measured period reaches a predetermined time period.

2. A method for controlling resistance welding comprising the steps of:
   holding a welding site of a material to be welded between a pair of electrodes;
   applying an initial current smaller than a welding current to perform resistance welding between the electrodes in advance of performing welding;
   detecting a resistance value between said electrodes under the presence of the initial current;
   controlling the pressure of the electrodes on the basis of the detected resistance value to adjust the resistance value between said electrodes to a predetermined initial resistance value;
   applying the welding current between said electrodes;
   detecting the resistance value between said electrodes while the welding current is applied;
   controlling the pressure in accordance with the resistance value during application of the welding current to maintain the resistance value between said electrodes to a given resistance value having a given relationship to said initial resistance value;
   detecting the voltage between said electrodes while the welding current is applied;
   controlling the current value to be applied between said electrodes to adjust the voltage detected between said electrodes to a predetermined voltage; and
   measuring a time period during which said welding current is applied and interrupting the welding current when the measured time period reaches a predetermined time period.

3. A method for controlling resistance welding comprising the steps of:
   holding a welding site of a material to be welded under pressure between a pair of electrodes;
   applying an initial current between said electrodes, which initial current has a value smaller than that of a welding current, before applying said welding current;
   detecting an initial resistance value between said electrodes with respect to said initial current before applying said welding current;
   controlling the pressure between said electrodes to a controlled pressure depending upon the detected initial resistance value to adjust the initial resistance value to a predetermined resistance value;
   applying said welding current between said electrodes in the presence of the controlled pressure between said electrodes;
   continuously detecting the resistance value between said electrodes while applying said welding current thereto;
   continuously controlling said pressure on the basis of the detected resistance value to adjust the resistance value between said electrodes so as to be constantly maintained within a given allowable range with respect to a given resistance value having a given relationship to said predetermined resistance value;
   continuously detecting the voltage between said electrodes while applying said welding current during application of the controlled pressure;
   controlling the current value applied between said electrodes on the basis of the detected voltage to adjust the voltage so as to be constantly maintained within a given allowable range with respect to a predetermined voltage; and
   measuring the time period during which the welding current is applied and interrupting the welding current when the measured time period reaches a predetermined time period.

4. A method for controlling resistance welding comprising the steps of:
pressing a pair of electrodes under pressure onto a welding site of a material to be welded;
applying an initial current having a magnitude smaller than that of a welding current between said electrodes, before applying said welding current;
presetting a predetermined resistance value and a predetermined voltage;
applying said welding current between said electrodes;
detecting the magnitude of said welding current and said initial current at given times;
detecting the voltage between said electrodes at the given time;
arithmetically determining an initial resistance value on the basis of a detected initial current value and the detected voltage and comparing the determined initial resistance value with said predetermined resistance value to obtain the difference therebetween;
adjusting said pressure between said electrodes depending upon the determined difference between said determined and predetermined resistance values so that said difference is maintained smaller than a given value;
comparing the detected voltage with said predetermined voltage to determine a voltage difference;
controlling the welding current to be applied on the basis of the determined voltage difference so as to keep the difference smaller than a given value; and
measuring a period of time during which said welding current is applied and interrupting said welding current when the measured period of time reaches a predetermined period of time.

5. A controlling apparatus for resistance welding comprising:
first means for detecting a first resistance between a pair of welding electrodes by applying an initial current having a value smaller than that of a welding current before supplying the welding current to the welding electrodes, between which members to be welded are pinched, comparing the detected resistance to a predetermined reference resistance to control the pressure between the welding electrodes on the basis of the difference between the detected and predetermined resistances, detecting a second resistance between said welding electrodes while supplying the welding current, and comparing the detected second resistance with a given resistance having a given relationship to said predetermined resistance to control the pressure between said welding electrodes on the basis of the difference of the detected second and given resistances;
second means for detecting the voltage between said welding electrodes while supplying the welding current, comparing the detected voltage with a predetermined reference voltage and controlling the welding current on the basis of the difference between the detected and reference; and
third means for interrupting the welding current when a predetermined current supply time has elapsed to control the period of time for carrying out resistance welding.

6. A controlling apparatus for resistance welding which comprises first means for detecting a first resistance between a pair of welding electrodes by supplying an initial current having an amplitude smaller than that of a welding current before the start of supply of welding current to the electrodes between which members to be welded are pinched, comparing the detected first resistance to a predetermined first reference resistance to control the pressure between the welding electrodes in accordance with the difference between said detected and reference first resistances, detecting a second resistance between said welding electrodes while supplying the welding current thereto, and comparing the detected second resistance to a predetermined second reference resistance having a given relationship to said first predetermined reference resistance to control the pressure between the above welding electrodes in accordance with the difference between said detected second resistance and second predetermined reference resistance, means for detecting the voltage between said welding electrodes while supplying the welding current, comparing the detected voltage to a predetermined reference voltage and controlling the welding current in accordance with the difference between said detected and reference voltages, means for interrupting the welding current when a predetermined current supply time has elapsed to control the supply time, and means for detecting the time integral of said detected welding electrode voltage, and interrupting the welding current when the detected integral has reached a predetermined reference integral voltage to control the supply time.

7. A controlling system in resistance welding which comprises:
first means for detecting the resistance between a pair of welding electrodes by supplying an initial current having an amplitude smaller than that of a welding current before supplying of the welding current to the electrodes between which members to be welded are pinched, comparing the detected resistance to a predetermined reference resistance to control the pressure between the welding electrodes on the basis of the difference between the resistances, detecting the resistance between the welding electrodes while supplying the welding current thereto, and comparing the detected resistance with a predetermined reference resistance to control the pressure between the welding electrodes on the basis of the difference between the detected and reference resistances;
second means for detecting the voltage between the welding electrodes while supplying said welding current, comparing the detected voltage with a predetermined reference voltage and controlling the welding current on the basis of the difference between said detected and reference voltage; and
third means for integrating said difference voltage when the detected electrode voltage exceeds a predetermined reference voltage and interrupting the welding current when the integral has reached a predetermined reference integral to control supply time.

8. A controlling system in resistance welding according to any one of claims 5, 6 and 7 which further comprises means (32, 33, 34) for detecting a current supply path on the basis of the resistance between the above welding electrodes and displaying the arrival of replacement timing for the welding electrodes when the free end diameter of the welding electrode indicated by the detected supply path has reached a predetermined free end diameter of the welding electrode.

* * * * *